Oct. 21, 1952 J. A. HOLLAND 2,614,881
WELL FISHING TOOL
Filed May 12, 1950
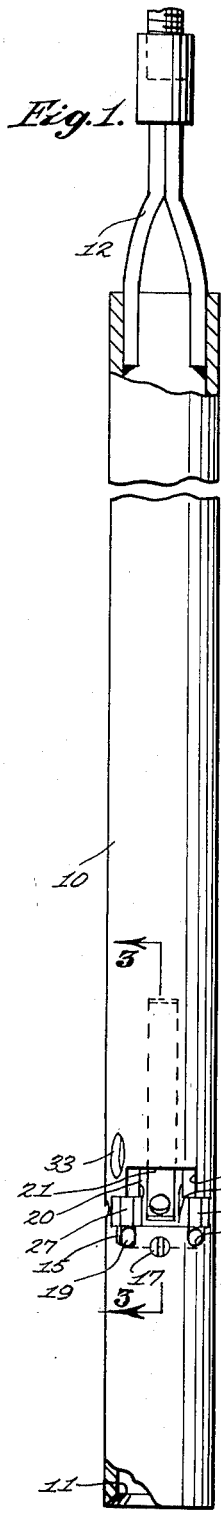
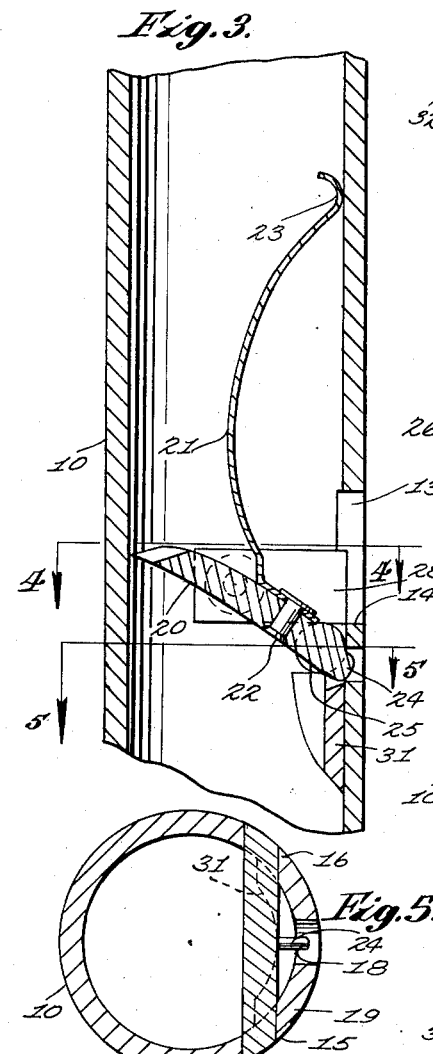
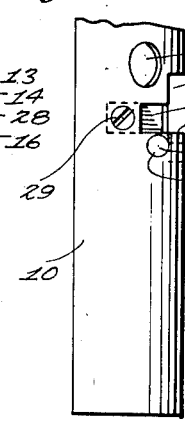
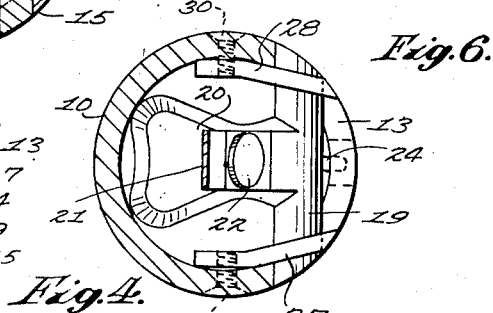
INVENTOR.
JACOB A. HOLLAND
BY
McMorrow, Berman & Davidson
ATTORNEYS Patented Oct. 21, 1952

2,614,881

UNITED STATES PATENT OFFICE 2,614,881

WELL FISHING TOOL

Jacob A. Holland, Brady, Tex.; Lena Allatha Holland administratrix of said Jacob A. Holland, deceased Application May 12, 1950, Serial No. 161,503

2 Claims. (Cl. 294—86)

This invention relates to well fishing tools and more particularly to a tubular tool having at least one automatically operated gripping tongue for engaging a body such as a pipe, rod, string section or bit, lost in the well, and raising such body from the well.

It is among the objects of the invention to provide an improved well fishing tool to be lowered into a well to engage a body in the well and raise such body out of the well, which includes a tubular bell or housing and a spring actuated tongue or dog pivotally mounted in the housing for engaging a body, such as a pipe or rod, in the housing, and locking such body to the housing for removal from the well, which is effective to firmly grasp any elongated body which will pass into the housing and from which the body can be easily released when desired, which will grasp bodies of different sizes within the capacity of the housing, and which is strong and durable in construction, positive and effective in operation and easy to use.

Other objects and advantages will become apparent from a consideration of the following description and the appended claims in conjunction with the accompanying drawing wherein:

Figure 1 is a side elevational view of a well fishing tool illustrative of the invention, a portion being broken away and shown in cross section to better illustrate the construction thereof;

Figure 2 is a side elevational view of a fragmentary portion of the tool illustrated in Figure 1 with the tool rotated 90 degrees from the position illustrated in Figure 1;

Figure 3 is a longitudinal cross sectional view on an enlarged scale on the line 3—3 of Figure 1;

Figure 4 is a transverse cross sectional view on the line 4—4 of Figure 3;

Figure 5 is a transverse cross sectional view on the line 5—5 of Figure 3; and

Figure 6 is a longitudinal cross sectional view similar to Figure 3 but showing the tool with a piece of pipe locked therein.

With continued reference to the drawing, the fishing tool comprises an elongated tubular housing or bell 10 which is preferably of cylindrical shape and of a size sufficient to internally receive bodies such as pipe sections, rods and bit stem sections which may be broken and lost in the well. At one end the housing 10 is internally flared, as indicated at 11, to facilitate the passage of this lower end of the tool over the upper end of a body to be removed from the well. A bail 12 is secured to the housing and projects from the other end thereof for attachment to one end of a cable by means of which the tool is lowered and raised in the well.

Intermediate its length and near the lower flared end thereof the housing 10 is provided with an opening 13 which is preferably of rectangular shape and provides at its end adjacent the flared end 11 a straight edge 14 which extends transversely or partly circumferentially of the housing. Two rounded notches 15 and 16 are provided in the housing, one at each end of the straight edge 14 and at the side of the straight edge 14 opposite the opening 13. A round aperture 17 is provided in the housing substantially midway between the notches 15 and 16 and a groove 18 is provided in the inner surface of the housing at the inner end of the aperture 17.

A body engaging structure is provided in the housing and comprises a pin portion 19 the respectively opposite ends of which are rotatably received in the notches 15 and 16, a tongue portion 20 extending laterally from the pin portion 19 substantially symmetrical with the midlength location of the pin portion and a flat spring 21 secured to the tongue portion 20 by a rivet 22 and extending along the inner surface of the housing in a direction away from the pin portion 19 and past the opening 13. The tongue portion 20 has a length somewhat greater than the diameter of the housing 10 and extends from the pin portion 19 in a direction away from the flared bottom end of the housing so that the tongue portion extends upwardly from the pin portion when the tool is in its position in a well.

The tongue 20 is sharpened at its end opposite the pin 19 to provide a sharpened edge for engaging bodies received in the housing 10 and is also concavely curved to facilitate its engagement with bodies of circular cross sectional shape.

The spring 21 is longitudinally bowed and has at its end opposite that secured to the tongue 20 a recurved portion 23 which is slidable along the inner surface of the housing 10 at the same side of the housing in which the opening 13 is provided to resiliently urge the tongue in a direction away from the opening 13. The tongue has a length somewhat greater than the diameter of the housing so that when the housing is empty the sharpened end of the tongue will rest against the side of the housing opposite the opening 13 with the tongue inclined upwardly and transversely of the housing. A lug 24 is provided on the pin portion 19 substantially at the mid-length location of the latter and this lug engages in the notch 18 to hold the pin portion against longitudinal movement in the housing. The ends of the pin portion 19 are beveled off to conform to the cylindrical external shape of the housing, as is clearly illustrated in Figure 5, and the side of the tongue facing the center of the housing is also concavely recessed, as indicated at 25 in Figure 3, to provide additional clearance for objects, such as the pipe section 26 shown in Figure 6, to pass upwardly through the interior of the housing past the pin portion 19 and tongue portion 20 of the body engaging structure.

Two pin retaining plates 27 and 28 are detachably secured in the housing by suitable means, such as the screws 29 and 30 and these plates extend through the opening 13 at the respectively opposite ends of the opening and bear on the pin portion 19 at the opposite ends of the latter to secure the pin portion in the notches 15 and 16.

A tapered wedge 31 shaped to conform to the internal shape of the housing is mounted on the inner surface of the housing immediately at the side of the pin portion 19 opposite the opening 13 to guide bodies, such as the pipe section 26 past the pin portion 19 of the body engaging structure.

With the above described arrangement and with the tool suspended from a cable by the bail 12, as the tool is lowered into a well with the flared end of the tool housing at the bottom of the tool, the upper end of a body, such as a broken pipe section, to be removed from the well, will pass into the lower end of the housing and upwardly through the interior of the latter, the housing 10 having sufficient weight to force itself downwardly past the upper end of the body. If necessary, additional weight may be added to the housing in the form of drill stem sections secured to the upper end of the housing or by other suitable means, and when the upper end of the body has passed upwardly through the housing past the body engaging structure, the tool may be raised and the tongue 20 will engage the adjacent side of the body and lock the body in the housing for removal from the well.

If the body to be removed from the well is of soft material, such as a wooden sucker rod, the sharpened end of the tongue 20 will dig into the material of the body at any location along the body and firmly lock the body to the housing of the tool. In the case of a length of pipe, such as the pipe 26 illustrated in Figure 6, the tongue will usually slide along the surface of the pipe to the nearest collar 32 and will engage under the collar to prevent movement of the pipe section out of the housing.

When the tool has been raised above the head of the well and the body secured against falling back into the well the body may be released from the tool by inserting a suitable implement, such as a screwdriver through an opening 33 provided in the wall of the housing 10 adjacent the opening 13, such implement being used to force the tongue portion 20 of the body engaging structure out of engagement with the body held in the housing.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A well fishing tool comprising an elongated tubular housing having an upper end and a lower end with its lower end internally flared and having intermediate its length an opening providing at its lower end a straight edge extending transversely of the housing, said housing also having therein two rounded notches disposed one at each end of said straight edge and below the latter in communication with said opening, a structure disposed in said housing and comprising a pin portion rotatably received at its respectively opposite ends in said notches, a tongue portion extending upwardly from said pin portion and having a sharpened edge at its end remote from said pin portion, and a flat spring secured at one end to said tongue portion and bearing at its other end against the interior of said housing above said opening, retaining plates disposed within said housing and extending through said opening at respectively opposite sides of the latter and over the corresponding ends of said pin portion to retain said pin portion in said notches, and a bail secured to and projecting from the upper end of said housing.

2. A well fishing tool comprising an elongated tubular housing having an internally flared lower end, a bail secured to its upper end and an opening intermediate its ends, said opening having a substantially straight bottom edge and rounded notches disposed one at each end of said bottom edge, a transversely curved wedge disposed in said housing with its upper edge substantially flush with the lower edge of said opening and its lower edge beveled downwardly toward the inner surface of the housing, a pin extending along the bottom edge of said opening and having its ends journaled one in each of said notches, a lug projecting from said pin intermediate the length of the latter and a tongue projecting laterally from said pin and extending upwardly from said pin and inwardly of said housing, said housing and said wedge having recesses receiving said lug to restrain said pin against longitudinal movement relative to said housing and said tongue being tapered in thickness in a direction away from said pin and having its distal end beveled and concavely curved, retaining plates detachably secured within said housing and bearing on said pin one near each end thereof to cooperate with said lug in retaining said pin in operative position in said housing, and a longitudinally curved flat spring attached at one end to said tongue and bearing at its other end against the inner surface of said housing above said tongue to resiliently urge the distal end of said tongue toward the side of said housing remote from said pin.

JACOB A. HOLLAND.

REFERENCES CITED

The following references are of record in the file of this patent:

UNITED STATES PATENTS

| Number | Name | Date |
| --- | --- | --- |
| 1,780,699 | Brown | Nov. 4, 1930 |
| 2,067,009 | Hinderliter | Jan. 5, 1937 |